(12) United States Patent
Lind et al.

(10) Patent No.: US 6,425,345 B1
(45) Date of Patent: Jul. 30, 2002

(54) METHOD OF AND A DEVICE FOR MILKING AN ANIMAL

(75) Inventors: Ole Lind; Anders Björk, both of Tumba (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 09/600,611

(22) PCT Filed: Jan. 4, 1999

(86) PCT No.: PCT/SE99/00003

§ 371 (c)(1),
(2), (4) Date: Aug. 18, 2000

(87) PCT Pub. No.: WO99/35904

PCT Pub. Date: Jul. 22, 1999

(30) Foreign Application Priority Data

Jan. 16, 1998 (SE) .............................. 9800100

(51) Int. Cl.[7] .............................. A01J 5/007; A01J 5/04
(52) U.S. Cl. .................................... 119/14.02; 119/14.1
(58) Field of Search .............................. 119/14.02, 14.1, 119/14.08

(56) References Cited

U.S. PATENT DOCUMENTS 5,069,160 A * 12/1991 Street et al. ............. 119/14.08
5,713,301 A * 2/1998 van der Lely ........... 119/14.02
5,791,283 A * 8/1998 Schulte ....................... 119/14.1
6,170,434 B1 * 1/2001 van der Lely et al. .... 119/14.02

FOREIGN PATENT DOCUMENTS

| | | |
|---|---|---|
| EP | 313109 | 3/1986 |
| EP | 611004 | 2/1994 |
| GB | 2258382 | 2/1993 |
| SE | 430559 | 11/1983 |

* cited by examiner

Primary Examiner—Robert P. Swiatek
(74) Attorney, Agent, or Firm—Hovey Williams LLP

(57) ABSTRACT

A method and device for milking an animal by using at least one milking machine (5) including at least one teatcup (3) having a teatcup liner (11) forming a space defined by a wall surface. The teatcup (3) is arranged to be applied to a teat in such a manner that the wall surface extends around and abuts the teat. The device includes a control unit arranged to control the application of the teatcup (3) in such a manner that an arbitrary portion of the wall surface abuts different teat portions during a first milking occasion with respect to an animal and during a later milking occasion with respect to this animal, respectively.

20 Claims, 4 Drawing Sheets

METHOD OF AND A DEVICE FOR MILKING AN ANIMAL

BACKGROUND OF THE INVENTION

1. Field of the Invention

The present invention refers to a method for milking an animal by means of at least one milking machine comprising at least one teatcup having a teatcup liner forming a space defined by a wall surface, the method comprising the step of applying said teatcup to a teat in such a manner that the wall surface extends around and abuts the teat. Moreover, the invention refers to a device for milking an animal by means of at least one milking machine comprising at least one teatcup having a teatcup liner forming a space defined by a wall surface, said teatcup being arranged to be applied to a teat in such a manner that the wall surface extends around and abuts the teat.

2. Description of the Prior Art

The teatcup liners which are provided in teatcups of such milking machines defined above are subjected to a pulsating movement due to the cyclically alternating pressure level prevailing in the pulsating chamber formed in the teatcup between the outer surface of the teatcup liner and the inner surface of a teatcup shell in relation to the relatively low pressure level prevailing in the inner space defined by the teatcup liner. One says that the teatcup liner collapses cyclically. At each collapse the teatcup liner is compressed in such a manner that the milk flow through the teat is hindered.

When a teatcup liner collapses the wall of the teatcup liner is folded along two diametrically opposed, essentially vertical folding lines (flexing folds), which are relatively well defined. It is to be noted that there are also teatcup liners which are manufactured in such a manner that flexing folds are obtained at for instance three predetermined locations. In most cases, it has appeared that teatcup liners collapse at the same location at each collapse occasion, i.e. the wall of the teatcup liner is folded along the same folding lines each time. One reason for this phenomenon may be small differences in the thickness of material of the wall of the teatcup liner. In practice, such differences are not possible to avoid in teatcup liners available today by the manufacturing methods which are offered, i.e. any usual moulding method. However, even if it is possible to manufacture a teatcup liner with an absolutely uniform wall thickness a weakening arises at each collapse occasion and because thereof such predetermined positions for the flexing folds will develop.

Today, the equipment and methods are developed for automatic and voluntary milking of cows, i.e. systems where the cows are permitted to walk about freely and at need visit a milking stall having a milking robot for automatic application of the teatcups to the teats of the cow. The application may, for instance, be performed by means of a robot arm engaging and applying the teatcups successively in a determined order by means of a support frame which may be positioned by a robot arm and which comprises the four teatcups suspended by a respective small arm which is arranged to project the teatcup vertically, by means of a support frame which may be positioned by a robot arm and which comprises four teatcups which are applied successively by moving the support frame upwardly against the teats, or by means of a fixed set of teatcups which by means of a robot arm are applied simultaneously to the teats of the cow. In these cases, each teatcup will be applied to the same teat at each milking occasion with respect to one cow. In addition, the teatcup will have the same orientation with respect to "its" teat. This means that the folding lines mentioned above will be located at essentially the same location at each milking occasion with respect to each individual teat. Due to the fact that the teatcup liner always collapses at the same location on the teat, there is a risk of injuries on the teat, in particular with regard to the fact that the cows will be milked more frequently by the automatic milking system described above then by the previously used conventional milking methods with manual application of the teatcups.

Also in cases of, for instance, a milking parlour with several milking stalls, there is a risk that the teatcup liner will collapse at the same location on the teat at successive milking occasions, in particular in connection with a higher degree of automatization with respect to the application of the teatcups.

SUMMARY OF THE INVENTION

The object of the present invention is to provide a method and a device by which this risk of injuries may be reduced or remedied.

This object is obtained by the method initially defined and characterized in that the application of said teatcup is controlled in such a manner that an arbitrary portion of the wall surface with a significant frequency abuts different teat portions during a first milking occasion with respect to an animal and during a later milking occasion with respect to this animal, respectively. By such a method, one may avoid the collapse of the teatcup liner at the same location with respect to the teat, at least not at each milking occasion. The risk of injuries on the teat ought to be reduced even if the collapse location of the teatcup liner is not displaced at each milking occasion.

According to an embodiment of the invention, said first and second milking occasions form two successive milking occasions. According to this embodiment, the risk of the injuries mentioned above should be completely eliminated.

According to a further embodiment of the invention, the control is obtained by rotating said teatcup between the first milking occasion and the second milking occasion. Thereby, said teatcup may be rotated about a longitudinal centre axis extending through the teatcup. By rotating the teatcup in such a manner about its own axis, it may be ensured that it collapses at different locations with respect to the teat at each milking occasion.

According to a further embodiment of the invention, the control is obtained by applying said teatcup to a teat at the first milking occasion and to another teat at the second milking occasion. Since different teatcup liners collapse at different locations it is also possible to ensure with a great probability by such a measure that a teat will be subjected to a teatcup liner which collapses at different locations with respect to the teat at different milking occasions. This measure may, for instance, be realised by rotating said teatcup about an axis of rotation, which extends outside the teatcup and in parallel to a longitudinal centre axis through the teatcup.

According to a further embodiment of the invention, the method involves milking of said animal by a first milking machine at the first milking occasion and by a second milking machine at the second milking occasion.

According to a further embodiment of the invention, the application of said teatcup is performed by means of a gripping member of a device for automatic application of a teatcup to a teat of an animal. Thereby, the milking machine may comprise a set of teatcups and the control may be obtained by applying the teatcups of this set to the teats of an animal in a first order at the first milking occasion and in a second order at the second milking occasion. Said first and second order may refer to the succession by which the teatcups are engaged by means of said gripping member from a teatcup magazine which is arranged to enable storing of the teatcups between said milking occasions.

According to a further embodiment of the invention, the control is obtained by means of an identification of the animal in question at each milking occasion and by a registration of the teat portion which said portion of the wall surface of the teatcup liner abuts at said first milking occasion for determining the teat portion which said portion of the wall surface of the teatcup liner is to abut at said second milking occasion. Moreover, it is possible to obtain the control by means of a random number generator for determining the teat portion which the portion of the wall surface of the teatcup liner is to abut at the respective milking occasion.

The object is also obtained by the device initially defined and characterized by means arranged to control the application of said teatcup in such a manner that an arbitrary portion of the wall surface with a significant frequency abuts different teat portions during a first milking occasion with respect to an animal and during a later milking occasion with respect to this animal, respectively.

Advantageous embodiments of the device are set forth in the description and claims presented below.

BRIEF DESCRIPTION OF THE DRAWINGS

The present invention is now to be described more closely by means of different embodiments and with reference to drawings attached, in which FIG. 1 discloses schematically a view from above of a milking stall.

DETAILED DESCRIPTION OF DIFFERENT EMBODIMENTS OF THE INVENTION

Figure 1:
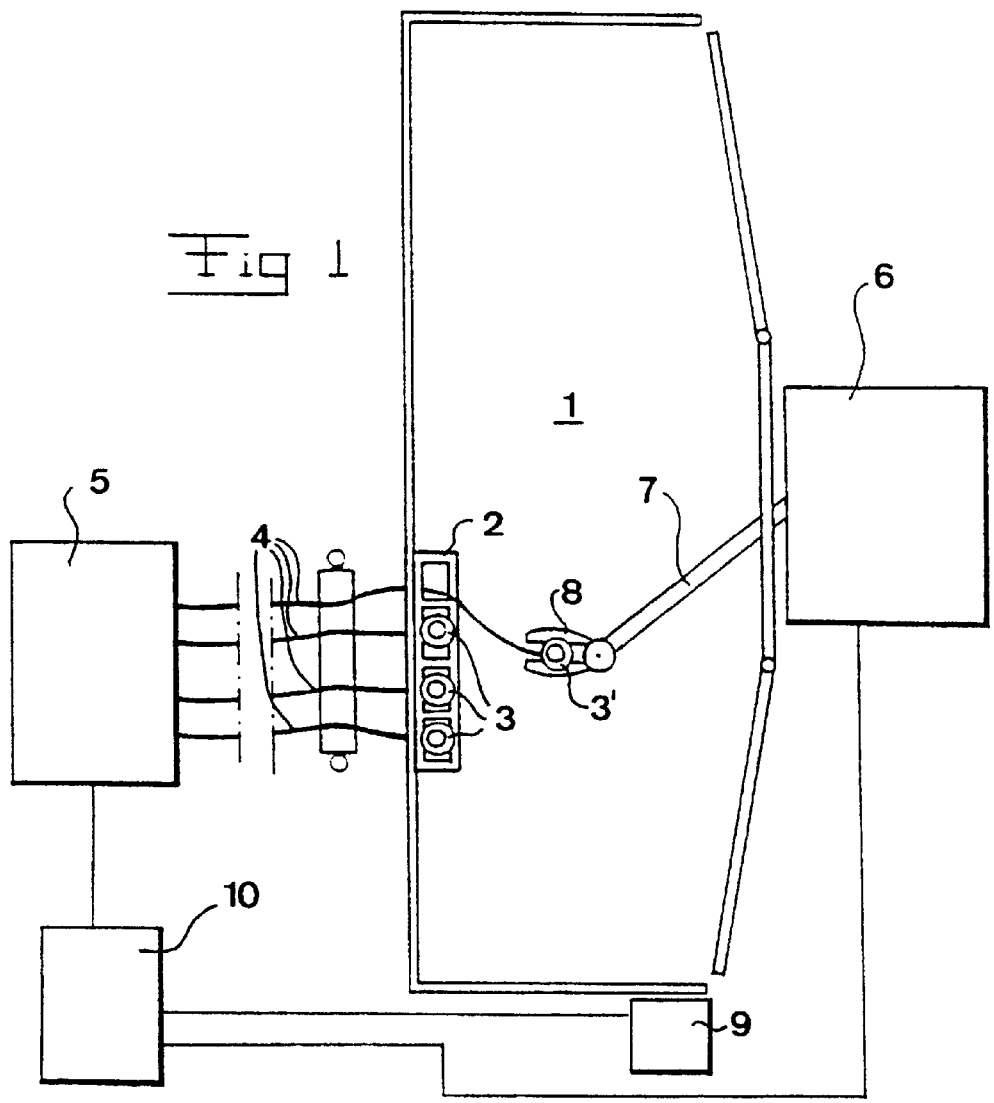

FIG. 1 discloses a milking stall defining a space 1 for an animal to be milked. In the following, it is referred to the milking of cows even if the method and the device according to the invention are applicable to all animals which are milked, for instance sheep, goats, buffaloes, horses etc. The milking stall comprises a teatcup magazine 2, which is arranged to receive four teatcups 3 which via a respective milk conduit 4 are connected to a milk collecting member of a schematically disclosed milking machine 5. The teatcup magazine 2 is arranged to store the teatcups 3 between each milking occasion and thereby also enable cleaning of the teatcups 3. Furthermore, in connection to the milking stall there is a device 6 for automatic application of the teatcups 3 to the teats of the cow to be milked. This device 6 is defined in the following as the milking robot 6 and comprises a robot arm 7 having a gripping member 8 which is arranged to engage and keep a teatcup 3. The milking stall 3 is intended to be located in a greater space where the cows are permitted to walk about freely and at need voluntarily visit the milking stall for being milked or where the cows are moved to the milking stall. It is to be noted, that the invention also is applicable to large stocks and where several milking stalls and milking robots are provided. In such applications, the cows may be moved in groups to the milking stalls. Furthermore, a schematically disclosed identification device 9 is provided in connection to the milking stall disclosed in order to enable identification of the individual cow entering the milking stall in order to be milked. The milking machine 5, the milking robot 6 and the identification device 9 are in the example disclosed connected to a control unit 10 for controlling the milking process and registering different individual-related parameters.

Figure 2:
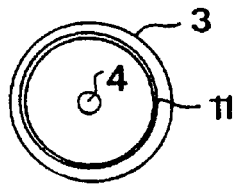
FIG. 2 discloses schematically a cross-sectional view of a teatcup having an open teatcup liner.
Figure 3:
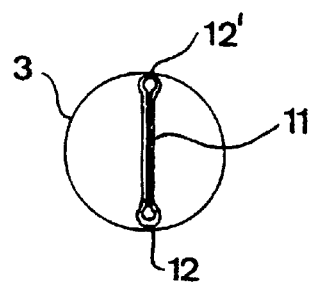
FIG. 3 discloses schematically a cross-sectional view of a teatcup having a closed teatcup liner.

Each teatcup 3 comprises a teatcup liner 11 which is disclosed in a cross-sectional view in FIGS. 2 and 3. In FIG. 2, the teatcup liner 11 is disclosed in an open condition, i.e. it has an essentially circular cross-sectional shape which permits a free milk flow through the teatcup liner, and in FIG. 2, the teatcup liner 11 is disclosed in an essentially closed or collapsed condition, in which essentially no milk flow through the teatcup liner 11 is permitted. It is to be noted that the invention also is applicable to teatcup liners having another cross-sectional shape than a circular one, for instance a triangular or rectangular cross-sectional shape. When the teatcup liner 11 collapses, it is folded along two essentially diametrically opposed folding lines 12, 12' which extend in the essentially longitudinal direction of the teatcup liner 11, i.e. essentially perpendicularly to the cross-section disclosed in FIGS. 2 and 3. Due to uneven parts in the wall of the teatcup liner and in particular in the thickness of the wall of the teatcup liner, the position of the folding lines 12, 12' of a specific teatcup liner will be the same at each collapse occasion.

In accordance with the present invention, the application of the teatcups 3 is controlled by means of the control unit 10 in such a manner that an arbitrary portion of an inner wall surface of the teatcup liner 11 of a teatcup 3 with a large probability will abut different teat portions at a first milking occasion with respect to the cow and at a later second milking occasion with respect to this animal, respectively. In other words, the folding lines 12, 12' will be located opposite to different teat portions at different milking occasions. The invention may be realised by the fact that the arbitrary wall surface portion of the teatcup liner 11 according to a first functional mode abuts different teat portions of different teats at different milking occasions, i.e. different teatcups are applied to the same teat at different milking occasions and/or according to a second functional mode abuts different teat portions of one and the same teat at different milking occasions. Advantageously, the first milking occasion and the second milking occasion may form two successive milking occasions.

According to a first embodiment, it is possible by the arrangement disclosed in FIG. 1 to obtain the first functional mode by applying a specific teatcup 3' by means of the milking robot 6 to a teat at the first milking occasion and applying said teatcup to another teat at the second milking occasion. Thereby, the teatcups 3 may be applied to the teats in a first order or succession at the first milking occasion and in a second order or succession at the second milking occasion. Here, the succession refers to the succession by which the teatcups 3 are engaged by means of the gripping member 8 from the teatcup magazine 2. Within the scope of the invention, it is of course also possible to engage the teatcups 3 from the teatcup magazine 2 in the same order but change the order by which the teatcups 3 are applied to the teats at different milking occasions. In both these cases, the succession at each milking occasion may be determined by means of the control unit 10. The cow which is present in the milking stall and is to be milked is identified by means of the identification device 9. By means of a registering member, for instance in the form of a computer memory (not disclosed) of the control unit 10, the succession which was applied at the preceding milking occasion with respect to this cow is registered. Now, the control unit 10 selects quite simply another succession by means of any determined algorithm or by means of a random number generator which may form a part (not disclosed) of the control unit 10. Of course, it is also possible to let the random number generator of the control unit 10 determine the succession at each milking occasion without considering the succession at the most preceding milking occasion. Even if in such a case there is a certain risk that the same teat portion will be subjected to the collapse location of the teatcup liner 11 at two successive milking occasions, it is very probable that a specific teat portion will not be subjected to one collapse location during several successive milking occasions.

Figure 4:
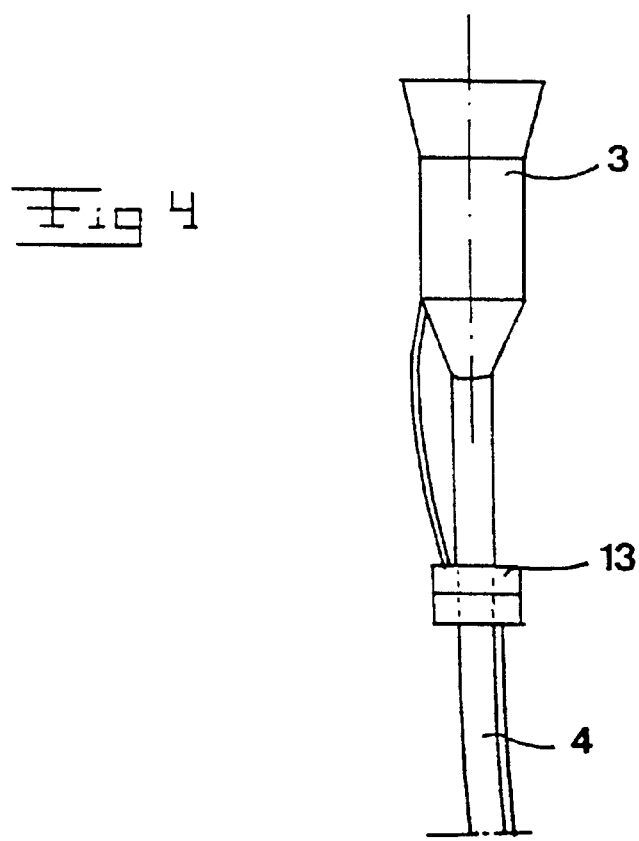
FIG. 4 discloses schematically a sideview of a teatcup and a part of a milk conduit.
Figure 5:
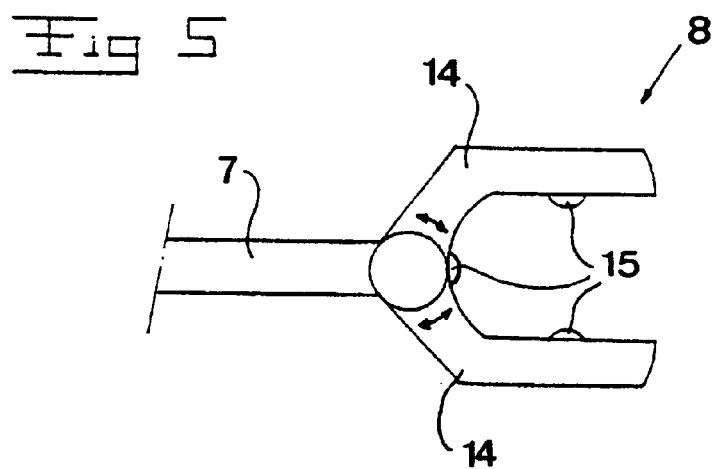
FIG. 5 discloses schematically a view from above of a gripping arm of a device for automatic application of teatcups.

According to a second embodiment, it is possible by the arrangement disclosed in FIG. 1 to obtain the second functional mode by rotating the teatcup 3, see FIG. 4, between the first milking occasion and the second milking occasion about a longitudinal centre axis x extending through the teatcup 3 in its longitudinal direction. Since the milk conduit 4 is relatively rigid with regard to a rotation, such a rotation of the teatcup 3 is facilitated by means of a swivel connection 13 permitting such a rotation. The swivel connection may be provided on the milk conduit 4, or between the milk conduit 4 and the teatcup 3 proper. The swivel connection 13 is, as appears of FIG. 4, advantageously designed in such a manner that it also permits rotation of the pulse conduit, wherein the pulse conduit and the milk conduit may form a common conduit bundle. The swivel connection 13 may thereby, for instance, comprise an inner passage for the milk and an outer chamber surrounding the inner passage and forming a passage for the pulse conduit. The rotation may, for instance, be provided by means of the gripping member 8 disclosed in FIG. 5. The gripping member 8 comprises two grip jaws 14 which may be moved towards and away from each other for engaging a teatcup 3 therebetween. The embodiment disclosed in FIG. 5 comprises three wheels 15, one on each grip jaw 14 and one which is provided between the grip jaws 14. When the teatcup 3 is engaged by the gripping member 8, the three wheels 15 will abut the circular cylindrical outer wall of the teatcup 3. Since one of the wheels 15 is driveable by means of a driving member (not disclosed) the teatcup 3 may be rotated. It is to be noted that it ought to be sufficient with a relatively small rotation of the teatcup 3 between each milking occasion in order to prevent the risk of injuries on the teat due to the collapse of the teatcup liner 11, for instance in the order of 5–15°. Moreover, the rotation may be controlled by means of the control unit 10 by the random number generator and/or by taking into consideration the knowledge of preceding milking occasions. The registering of a teat portion which abuts an arbitrary wall surface portion of the teatcup liner may be performed by determining the angle of rotation of the teatcup 3 in relation to a zero position.

Figure 6:
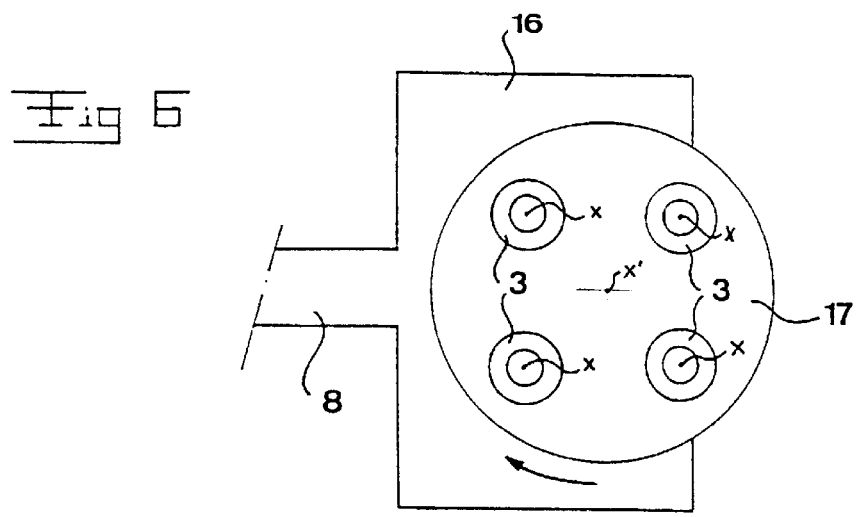
FIG. 6 discloses schematically a view from above of a part of a robot arm for the application of a set of teatcups according to one embodiment.
Figure 7:
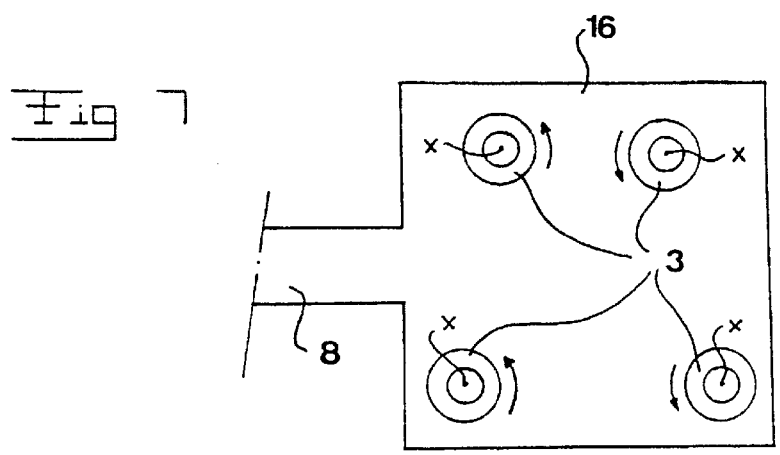
FIG. 7 discloses schematically a view from above of a part of a robot arm for the application of a set of teatcups according to another embodiment.

In FIGS. 6 and 7 is disclosed another type of milking robot having a robot arm 7 comprising a holder 16 arranged to hold a set of teatcups 3 and at the same time apply these teatcups 3 to the teat of a cow.

In FIG. 6 is disclosed a robot arm 7 having a holder 16 which according to a third embodiment operates according to the first functional mode mentioned above. The holder 16 comprises an element 17 which is arranged to receive four teatcups 3 and which is rotatably provided in the holder 16 about an axis x' of rotation, which is essentially parallel to the longitudinal centre axis x through each teatcup 3. By rotating the element 17 a quarter of a round between each milking occasion with respect to one cow, it is ensured that different teatcups 3 will be applied to the same teat at two successive milking occasions. In the same manner as according to the first embodiment, the rotation of the element 17 may be controlled by means of the control unit 10 and by a random number generator and/or by taking into consideration the knowledge of preceding milking occasions.

FIG. 7 illustrates a fourth embodiment operating according to the second functional mode and comprising a robot arm 7 having a holder 16 in which four teatcups 3 are rotatably provided about the longitudinal centre axis x extending through the respective teatcup 3. Also according to the fourth embodiment, the milk conduit 4 extending from each teatcup 3 may comprise a swivel connection for facilitating the rotational movement of the teatcup 3. In the same manner as according to the second embodiment, the rotation may be controlled by the control unit 10 by means of the random number generator and/or by taking into consideration the knowledge of preceding milking occasions.

Figure 8:
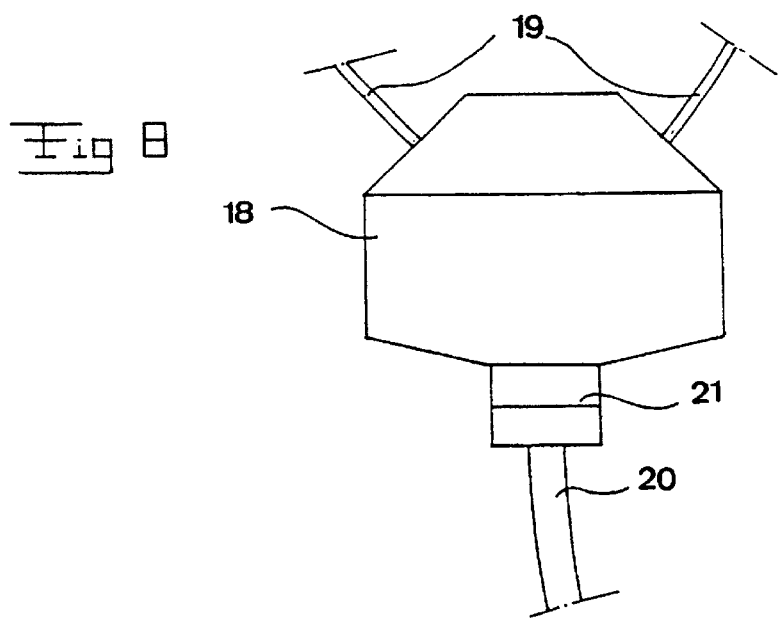
FIG. 8 discloses schematically a side view of a teatcup claw.

FIG. 8 illustrates a teatcup claw 18 which via four short milk conduits 19 (of which merely two are disclosed in FIG. 8) is connected to four teatcups 3 of the type disclosed above and via a conduit bundle 20 which may comprise long pulse conduits and a long milk conduit is connected to a milk receiving member of a milking machine (not disclosed in FIG. 8).

According to a fifth embodiment, working according to the first functional mode, the conduit bundle 20 may be provided with a swivel connection 21 permitting the rotation of the teatcup claw 18, for instance a quarter of a round, between each milking occasion. Also in this case, it is possible to control the rotation by means of the control unit 10 in the manner which is described above but this embodiment is also applicable to manual or semiautomatic milking, i.e. in the cases that the teatcups 3 are applied manually to the teats of a cow.

According to a sixth embodiment operating according to second functional mode, it is also possible to provide the short milk conduits 19 in such a manner that they are rotatable in the teatcup claw 18 or to provide each short milk conduit 19 with a swivel connection 13 of the type mentioned above.

Figure 9:
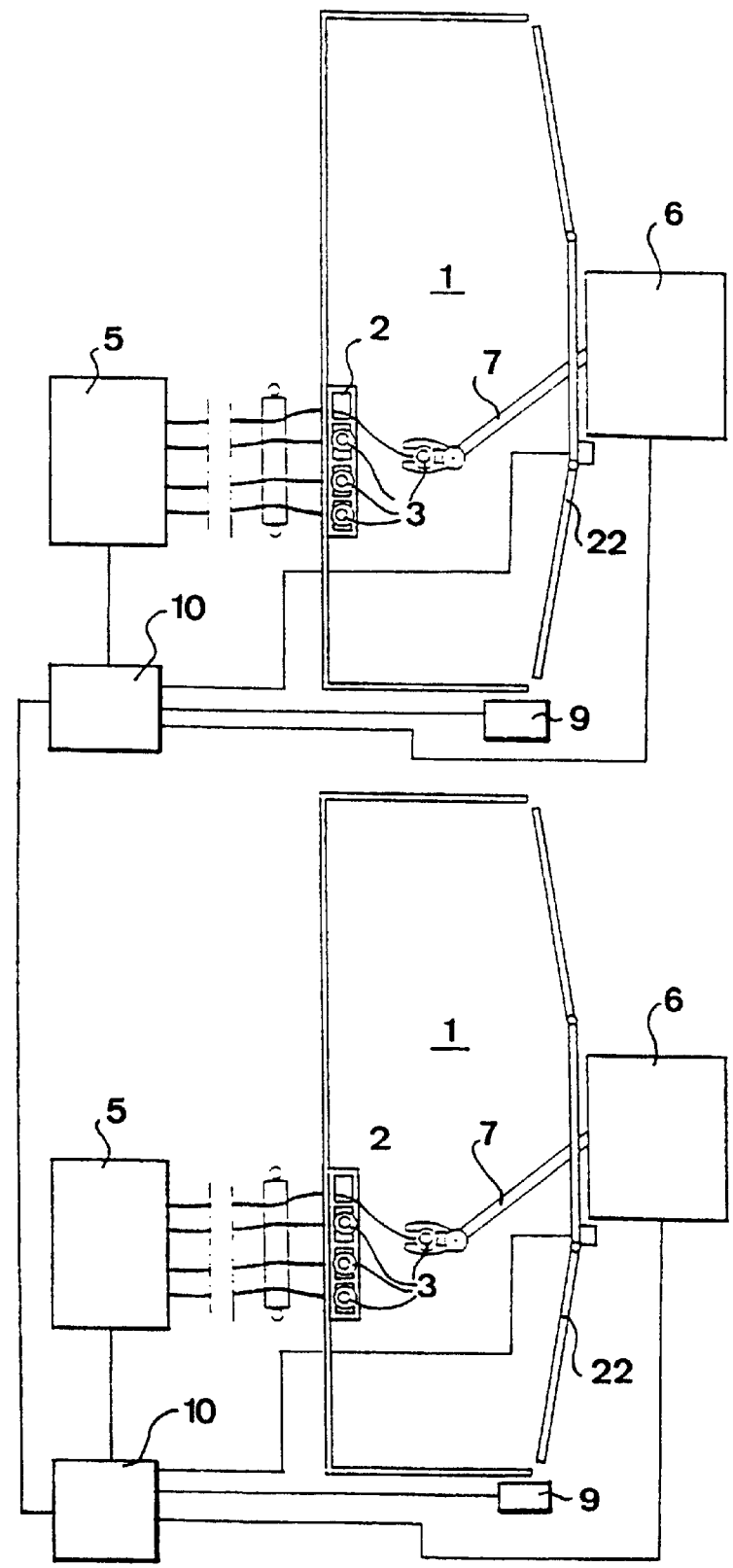
FIG. 9 discloses schematically a view from above of a milking plant having two milking stalls.

FIG. 9 illustrates a seventh embodiment operating according to the first functional mode. According to this embodiment, there are two, or possibly several, milking stalls having a respective milking machine 5. The control unit 10 in this embodiment is arranged to control the opening of an inlet gate 22 depending on which individual cow that approaches the milking stall and is identified by the identification device 9, for instance in such a manner that an individual cow is not given access to the same milking stall at two milking occasions following directly after each other. Advantageously, the different control units 10 are thereby connected to each other in order to enable exchange of information.

The present information is not limited to the embodiments described above but may be varied and modified within the scopes defined by the following claims. For instance, it is not necessary, within the scope of the invention, that the second milking occasion follows directly after the first milking occasion but it may be sufficient that the arbitrary portion abuts different teat portions at for instance only each third or fourth milking occasion. Furthermore, if there is a milking plant having for instance two milking stalls operated by a common robot, it is within the scope of the invention possible to utilise the set of teatcups of one milking stall in the second milking stall and vice versa.

What is claimed is:

1. A method for milking an animal by means of at least one milking machine comprising at least one teatcup having a teatcup liner forming a space defined by a wall surface, the method comprising the step of applying said at least one teatcup to a teat in such a manner that the wall surface extends around and abuts the teat, wherein the application of said at least one teatcup is controlled in such a manner that an arbitrary portion of the wall surface abuts different teat portions during a first milking occasion with respect to an animal and during a later milking occasion with respect to this animal, respectively.

2. A method according to claim 1, wherein said first and second milking occasions form two successive milking occasions.

3. A method according to claim 1, wherein the controlled manner is obtained by rotating said at least one teatcup between the first milking occasion and the second milking occasion.

4. A method according to claim 3, wherein said at least one teatcup is rotated about a longitudinal center axis extending through the at least one teatcup.

5. A method according to claim 3, wherein said at least one teatcup is rotated about an axis of rotation which extends outside the at least one teatcup and in parallel to a longitudinal center axis through the at least one teatcup.

6. A method according to claim 1, wherein the controlled manner is obtained by applying said at least one teatcup to a teat at the first milking occasion and to another teat at the second milking occasion.

7. A method according to claim 1, wherein the application of said at least one teatcup is performed by means of a gripping member of a device for automatic application of a teatcup to a teat of an animal.

8. A method according to claim 7, wherein said milking machine comprises a set of teatcups and that the control is obtained by applying the teatcups of this set to the teats of an animal in a first order at the first milking occasion and in a second order at a second milking occasion.

9. A method according to claim 8, wherein said first and second orders refer to the sequence by which the teatcups are engaged by said gripping member from a teatcup magazine arranged to enable storing of the teatcups between said milking occasions.

10. A method according to claim 8, wherein the controlled manner is obtained by means of an identification of the respective animal at each milking occasion and a registration of the teat portion which said portion of the wall surface abuts at said first milking occasion for determining the teat portion which said portion of the wall surface is to abut at the next second milking occasion.

11. A method according to claim 1, wherein the controlled manner is obtained by means of a random number generator for determining the teat portion which said portion of the wall surface is to abut at the respective milking occasion.

12. A device for milking an animal by means of at least one milking machine comprising:

at least one teatcup having a teatcup liner forming a space defined by a wall surface, said at least one teatcup being arranged to be applied to a teat in such a manner that the wall surface extends around and abuts the teat, and means arranged to control the application of said at least one teatcup in such a manner that an arbitrary portion of the wall surface abuts different teat portions during a first milking occasion with respect to an animal and during a later milking occasion with respect to this animal, respectively.

13. A device according to claim 12, wherein said means is arranged to enable rotation of the at least one teatcup between different milking occasions.

14. A device according to claim 13, wherein said rotation involves the rotation about a longitudinal center axis extending through the at least one teatcup.

15. A device according to claim 13, wherein said rotation involves the rotation about an axis of rotation, which extends outside the at least one teatcup and in parallel to a longitudinal axis through the at least one teatcup.

16. A device according to claim 12, including a device for automatic application of a teatcup to a teat of an animal by means of a gripping member.

17. A device according to claim 16, wherein said milking machine comprises a set of teatcups and that the device for automatic application of the teatcups is arranged to apply the teatcups of this set to the teats of an animal in a first order at the first milking occasion and in a second order a second milking occasion.

18. A device according to claim 17, wherein said first and second order refers to the sequence by which the teatcups are engaged by said gripping member from a teatcup magazine arranged to enable storing of the teatcups between said milking occasions.

19. A device according to claim 12, including an identification device arranged to identify the animal in question at each milking occasion, a registration device arranged to register the teat portion which said portion of the wall surface abuts at each milking occasion, and a processing device arranged to determine, by means of said registration, the teat portion which said portion of the wall surface is to abut at each milking occasion.

20. A device according to claim 12, including a random number generator arranged to determine the teat portion which said portion of the wall surface is to abut at each milking occasion.

* * * * *